United States Patent [19]

Kato

[11] Patent Number: 4,736,595
[45] Date of Patent: Apr. 12, 1988

[54] CIRCUIT FOR CONTROLLING INVENTER IN AIR CONDITIONER

[75] Inventor: Takashi Kato, Shimizu, Japan

[73] Assignee: Hitachi, Ltd., Tokyo, Japan

[21] Appl. No.: 9,783

[22] Filed: Feb. 2, 1987

[30] Foreign Application Priority Data

Feb. 3, 1986 [JP] Japan ............................ 61-20159

[51] Int. Cl.[4] .......................................... F25B 13/00
[52] U.S. Cl. .................................. 62/160; 62/228.4; 62/230
[58] Field of Search .......... 62/160, 228.1, 228.4, 62/228.5, 226, 230, 126, 129, 215; 361/22, 31

[56] References Cited

U.S. PATENT DOCUMENTS 3,691,785  9/1972  Ruff et al. .......................... 62/230
4,592,206  6/1986  Yamazaki et al. ................ 62/228.4

FOREIGN PATENT DOCUMENTS 0018046  2/1983  Japan ................................. 62/230
578031   6/1946  United Kingdom ............... 62/215

Primary Examiner—Harry B. Tanner
Attorney, Agent, or Firm—Antonelli, Terry & Wands

[57] ABSTRACT

Disclosed is an inverter control circuit in an air-conditioner, in which the parameters for controlling the inverter are changed over depending on the open air temperature, the cooling/heating operation mode of the air conditioner, taking into consideration the fact that the allowable maximum current of semiconductor devices constituting the inverter depends on the cooling capability, and hence on the season. In the heating operation in winter where the open air temperature is low, a larger current can be caused to flow in the inverter.

4 Claims, 4 Drawing Sheets

CIRCUIT FOR CONTROLLING INVENTER IN AIR CONDITIONER

BACKGROUND OF THE INVENTION

The present invention generally relates to an air conditioner, and particularly relates to a circuit for properly controlling an inverter to thereby control the capacity of a compressor in an air conditioner in accordance with the operation state of the air conditioner, whether the air conditioner is operated as a cooler or a heater.

As disclosed, for example, in U.S. Pat. No. 4,257,238, the capability of a compressor can be smoothly and continuously changed in accordance with an indoor air conditioning load by controlling an inverter circuit which drives a compressor motor. In the case of using such an inverter circuit as described above, generally, control is performed such that a current flowing in the inverter circuit is detected and a rotational speed of a compressor motor is reduced when the detected current exceeds a predetermined value, called as a limit current value. Semiconductor devices are used in such an inverter circuit, and it is known to reduce, generally, the rating of the semiconductor devices and the rate of derating varies in dependent of the ambient temperature. In the conventional inverter control circuit, however, no consideration has been given to the efficient use of an inverter circuit in accordance with the ambient temperature.

SUMMARY OF THE INVENTION

It is therefore an object of the present invention to eliminate the foregoing disadvantage in the prior art.

It is another object of the present invention to provide an inverter control circuit in an air conditioner provided with an inverter, in which the inverter circuit is efficiently used in accordance with an ambient temperature surrounding the inverter circuit, and, particularly, in which the heating power can be increased.

The allowable maximum junction temperature of a semiconductor device made of silicon, such as a diode, a power transistor or the like, used in an inverter is about 150° C. In designing the heat balance of the power transistor or the like, therefore, the rate of derating is selected so that the junction temperature of the transistor does not exceed its higher limit even when the equipment incorporating the transistor is used at a possible highest ambient temperature in an environment where the equipment is usually used. Accordingly, the semiconductor device is generally at a temperature much lower than the allowable maximum temperature when used at a normal ambient temperature.

Particularly, in the case of an air conditioner, the maximum value of the ambient temperature is limited to 43° C. when used in a cooling mode by Japanese Industrial Standard (JIS), and therefore in the case where an inverter is designed on the basis of the above-mentioned maximum value of the ambient temperature, there is a problem that the inverter cannot be used at its full capacity when the ambient temperature is low, for example, in the heating operation mode. In the case where the operating current of the inverter is set at a value such that the inverter can work at its full capacity in the heating operation mode, on the contrary, there is another problem that the inverter may work over its full capacity in the cooling operation mode.

The present invention has been made by taking account of the fact that in the winter when the air conditioner is generally used in an heating operation mode, the open air temperature is low and hence the ambient temperature of the power transistors is low so that a higher temperature rise is allowable in operation of the transistors. Therefore, it is possible to operate an inverter at its full capacity if the limit current value is changed depending on the operation mode of the inverter, that is, whether the inverter is used in the cooling mode or heating mode, even if the semiconductor devices having a relatively small capacity are used in the inverter.

To achieve the above objects, according to the present invention, an inverter-incorporated air conditioner is arranged to comprise a converter for converting an AC power applied from a power source into a DC power, an inverter for inverting the DC power applied from the converter into a frequency-controlled AC power to be used for driving a compressor motor, a current detection circuit for detecting a current flowing in semiconductor devices constituting the inverter, and a control circuit including an inverter control unit for controlling the frequency of the AC power produced by the inverter and an air-conditioning control unit for producing a frequency command in accordance with an air conditioning load, means for reducing the frequency of the AC output power of the inverter when the inverter current exceeds a given limit value, and means for selectively changing the limit value of the inverter current depending on the operating condition of the air conditioner, such that the limit current value is made lower in the cooling operation mode and higher in the heating operation mode.

The above and other objects, features, and advantages of the present invention will become more apparent when read the following description in conjunction with the accompanying drawings.

DESCRIPTION OF THE PREFERRED EMBODIMENT

Figure 1:
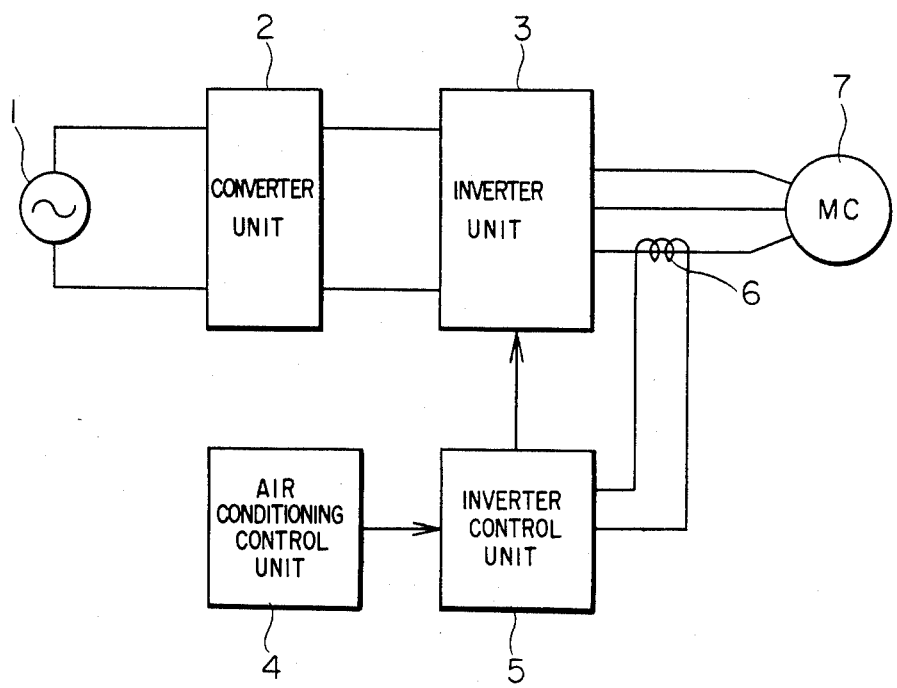
FIG. 1 is a block diagram showing an embodiment of the circuit for controlling an inverter in an air conditioner, according to the present invention.
Figure 2:
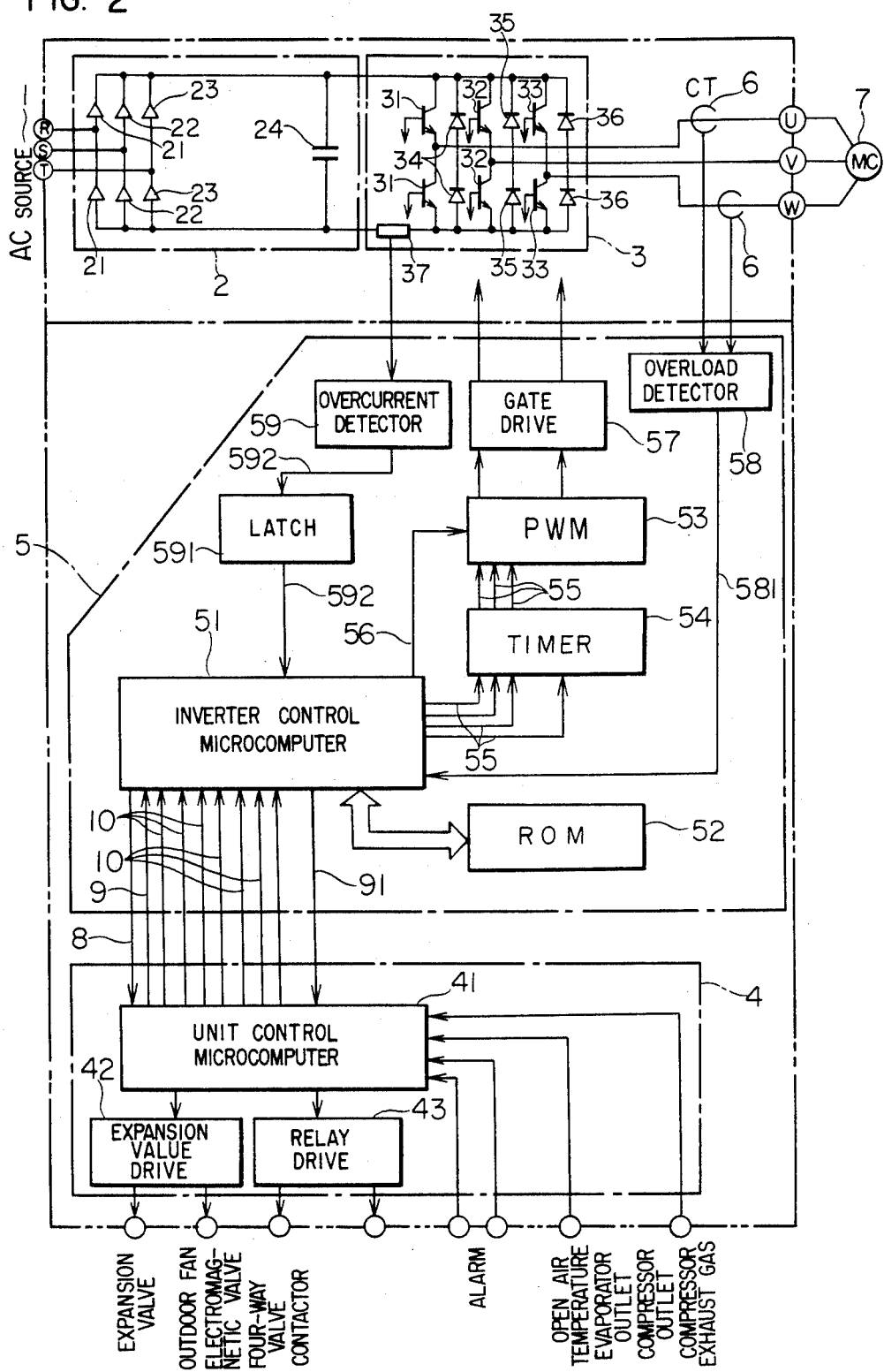
FIG. 2 is a diagram showing the control circuit of FIG. 1 more in detail.

Referring to FIGS. 1 and 2, an embodiment of the circuit for controlling an inverter in an air conditioner, according to the present invention, will be described hereunder, FIG. 1 being a block diagram showing the embodiment of the control circuit according to the present invention and FIG. 2 being a diagram showing the control circuit of FIG. 1 more in detail.

In FIG. 1, an AC power source 1 is connected to a converter unit 2 for converting an AC power into a DC power which is in turn supplied to an inverter unit 3. Power transistors are generally used as semiconductors devices constituting the inverter unit 3. The power transistors are turned on/off at a frequency and a timing produced from an inverter control unit 5 to thereby control the rotational speed of a compressor motor 7. In place of those power transistors, switching elements, such as gate turn-off thyristers or the like, which can be switched on/off, may be used. In running, a phase current of the compressor motor 7 is detected by a current transformer (CT) 6, and applied to the inverter control unit 5. An air-conditioner control unit 4, on the other hand, is arranged to send various command signals instructing the running/stopping of a compressor, the rotational speed of the compressor motor 7, the cooling-/heating operations, etc., to the inverter control unit 5 on the basis of the air conditioning data, such as a temperature, a pressure, and so on.

Referring to FIG. 2, the arrangement of the control circuit of FIG. 1 will be described more in detail. The converter unit 2 includes rectifying diodes 21, 22, and 23 respectively connected in the phases R, S, and T of the power source 1 and a smoothing capacitor (CB) 24 to provide a circuit for converting an AC power into a DC power. The inverter unit 3 includes power transistors 31, 32, and 33, diodes 34, 35, and 36 inverse-parallel connected to the power transistors 31, 32, and 33, respectively, and a shunt resistor (SH) 37 acting as a DC current sensor. The air-conditioner control unit 4 includes a unit control microcomputer 41, an expansion valve driving circuit 42, and a relay driving circuit 43, which are connected to various devices constituting a refrigerating cycle, such as an expansion valve, an electromagnetic valve, a four-way valve, an outdoor fan, an electromagnetic contactor, an outdoor air temperature sensor, a compressor discharge gas temperature sensor, a condenser outlet temperature sensor, an alarm, an evaporator outlet temperature sensor, and so on.

The inverter control unit 5 is provided with an inverter control microcomputer 51 connected to a memory (ROM) 52 for storing limit current values of two levels. A pulse width modulation circuit or PWM waveform synthesization circuit 53 is connected to a signal output side of the inverter control microcomputer 51 through a timer circuit (TIMER) 54 and through signal lines 55, while being directly connected to another signal output side of the inverter control microcomputer 51 through a signal line 56. The input side of a gate driving circuit 57 is connected to the output side of the PWM circuit 53, while the output side of the gate driving circuit 57 is connected to the inverter unit 3 so as to send signals to the respective bases of the power transistors 31, 32, and 33. An overload detection circuit 58 is arranged to receive a current detection signal detected by the current transformer 6 so as to detect an overload state to thereby send an overload detection signal to the inverter control microcomputer 51 through a signal line 581 upon detection of an overload state. An overcurrent detection circuit 59 is arranged to receive a current signal detected by the shunt resistor 37 so as to detect an overcurrent state in the DC current to thereby send an overcurrent signal to the inverter control microcomputer 51 through a latch circuit 591 and through a signal line 592.

Figure 4:
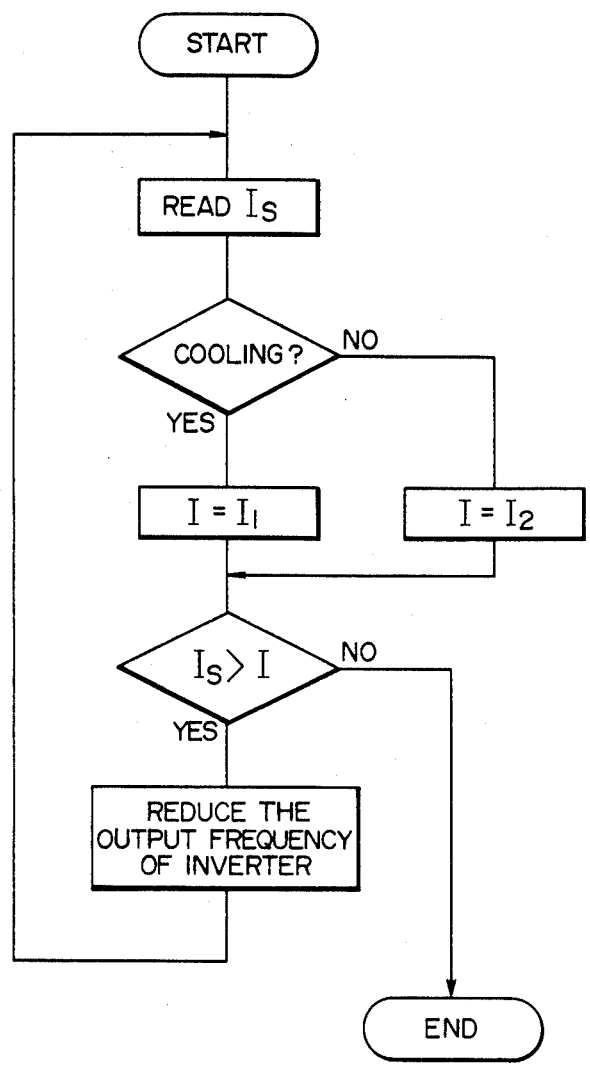
FIG. 4 is a flow chart in adjustment of the rate of derating the inverter according to the invention.

Assume that the relation $I_2 > I_1$ is established, where $I_1$ and $I_2$ represent the limit current values in cooling and heating operations, respectively. In operation, the current flowing in the compressor motor 7 increases as the load increases. This increase in current is supervised by means of the current value $I_S$ measured by the current transformer 6. When the thus measured current value $I_S$ becomes equal to or larger than the limit current value $I_2$ (or $I_1$), control is effected so as to lower the frequency of the output AC power produced from the inverter unit 3. Thus, according to the present invention, when the air conditioner is used in the cooling mode at an ambient temperature which is generally higher, the rating of the inverter is reduced by limiting its allowable maximum output current to a lower value, while the inverter is used at a higher rating by limiting its allowable maximum output current to a higher value when it is operated in the heating mode at an ambient temperature which is generally much lower. This control may be carried out by using a usual electronic control circuit or by software using a suitable program stored in the microcomputer 51. FIG. 4 shows a flow chart in one example of the control using software. In this case, the microcomputer is programmed to carry out the current monitoring routine periodically by interruption. Upon starting this routine, first the current $I_S$ is read out and then it is judged whether the air conditioner is operated in the cooling mode or not. When the air conditioner is operated in the cooling mode, the allowable maximum current of the inverter is set to $I_1$, while when air conditioner is not operated in the cooling mode, i.e. operated in the heating mode, the allowable maximum current I is set to $I_2$ which is higher than $I_1$. Then, it is judged whether the current $I_S$ is larger than I. If the current $I_S$ is larger than I, the frequency of the inverter is reduced by a predetermined value so as to reduce the current $I_S$. These steps are repeated until the current $I_S$ is rendered equal to or smaller than I.

Figure 3:
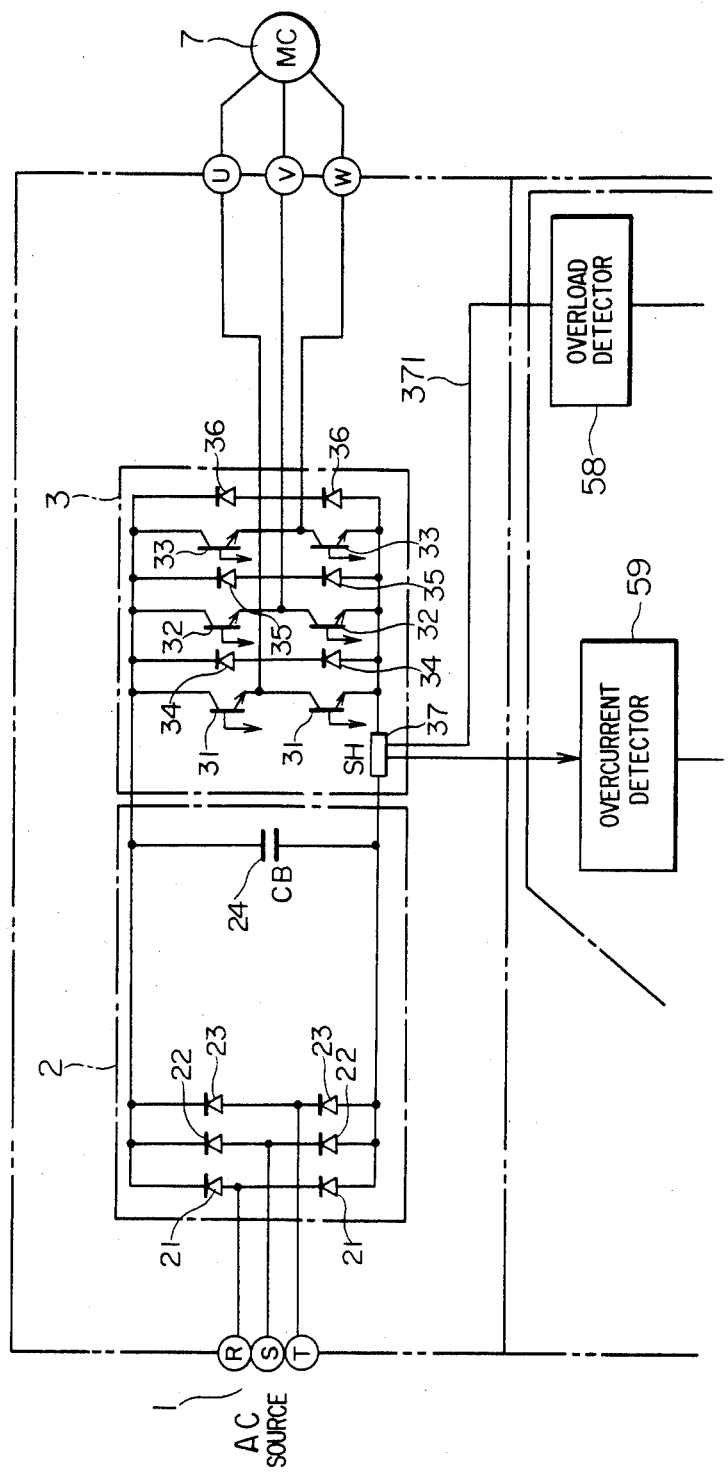
FIG. 3 is a circuit diagram showing the case where an over-current signal is detected from the DC circuit.

Although the limit current value is changed over on the basis of a command signal instructing cooling or heating operation in this embodiment, control can be performed with higher accuracy by using the open air temperature. Further, although description has been made as to the method of detecting a current flowing in the compressor motor 7 by using the current transformer 6, it is possible to obtain the same effect as described above if a shunt resistor 37 is inserted in the DC circuit between the converter unit 2 and the inverter unit 3 as shown in FIG. 3 and an overcurrent signal is taken into the overload detection circuit 58 through a signal line 371.

When an operation switch (not shown) for the air conditioner is turned on, a frequency command signal is sent from the air-conditioner control unit 4 to the inverter control unit 5. In the inverter control unit 5, the inverter control microcomputer 51 sends a waveform signal corresponding to the instructed frequency to the timer circuit 54 and the PWM circuit 53, and the PWM circuit 53 sends a signal to the base (gate) driving circuit 57 corresponding to the instruction so as to drive the power transistors 31, 32, and 33 in the inverter unit 3.

As a result, three-phase sinusoidal waves are applied to the compressor motor 7 connected to the inverter unit 3 owing to the on/off operation of the power transistors 31, 32, and 33 to thereby rotate the compressor motor 7.

The current flowing in the compressor motor 7 is taken by the current transformers 6 into the inverter control microcomputer 51 through the overload detection circuit 58 so as to control the control current.

The shunt resistor 37 in the DC circuit detects a DC current so as to protect the circuit components from being broken down when the DC current has an instantaneous value which exceeds a predetermined level. The AC voltage applied to the converter unit 2 is converted into a DC voltage through the diode module of the converter unit 2, and then smoothed by the smoothing capacitor 24. The DC voltage is then inversely transformed by the inverter unit 3 into a three-phase AC voltage which is in turn applied to the compressor motor 7.

The air-conditioner control unit 4 is arranged to send command signals instructing running/stopping of the compressor motor 7, and cooling/heating running in addition to the frequency command signal to the inverter control unit 5. The inverter control unit 5 is arranged to send an alarm signal, a control current signal, etc., to the air-conditioner control unit 4.

In short, in this embodiment, the limit current value $I_2$ in the heating operation is set to be larger than the limit current value $I_1$ in the cooling operation so that the limit current value is made large when the operation is changed over from the cooling mode to the heating mode to thereby make it possible to effect continuous running of the air conditioner.

As described above, according to the present invention, the control current value can be selectively changed over between the cooling and heating modes so that the control is advantageous in that the capacity of the compressor can be increased in the heating mode without increasing the rated capacity of the output devices, and the output devices can provide sufficient capability even if the capacity of the output devices is relatively small.

I claim:

1. An inverter control circuit for an air conditioner operative selectively in either a cooling or a heating mode, said control circuit comprising:
    a converter for converting an AC power supplied from a power source into a DC power;
    an inverter connected to said converter for converting the DC power supplied from the converter into a frequency-controlled AC power to be used for driving a compressor motor;
    a current detector connected between the power source and the compressor motor for detecting a current flowing therethrough; and
    a control unit including means for controlling the frequency of the AC power produced by said inverter based on an air-conditioning load, means for reducing the frequency of the AC power produced by said inverter when the current detected by said current detector exceeds a predetermined current level, and means for setting said predetermined current level at a first value corresponding to a rated capacity of the inverter during operation in the cooling mode and at a second value higher than said first value during operation in the heating mode.

2. An inverter control circuit according to claim 1, wherein said control unit further includes a memory for storing said first and second values of said predetermined current level, and a microcomputer for selecting one of said first and second values of the current level stored in said memory depending on whether the air-conditioner is operated in the cooling or heating mode.

3. An inverter control circuit according to claim 1, wherein said current detector is provided between the output of the inverter and the compressor motor.

4. An inverter control circuit according to claim 1, wherein said current detector includes a shunt provided between the converter and the inverter.

* * * * *